(12) United States Patent
Haralson et al.

(10) Patent No.: US 9,842,617 B1
(45) Date of Patent: Dec. 12, 2017

(54) ELECTRONIC SYSTEM WITH HEAD MANAGEMENT MECHANISM AND METHOD OF OPERATION THEREOF

(71) Applicant: Western Digital Technologies, Inc., Irvine, CA (US)

(72) Inventors: Phillip Scott Haralson, Huntington Beach, CA (US); Galvin T. P. Chia, Rancho Santa Margarita, CA (US); Steven R. Vasquez, Rancho Santa Margarita, CA (US); Mark McDaniel, Corona, CA (US)

(73) Assignee: WESTERN DIGITAL TECHNOLOGIES, INC., Irving, CA (US)

( * ) Notice: Subject to any disclaimer, the term of this patent is extended or adjusted under 35 U.S.C. 154(b) by 83 days.

(21) Appl. No.: 14/754,340

(22) Filed: Jun. 29, 2015

(51) Int. Cl.
| | |
|---|---|
| *G11B 5/02* | (2006.01) |
| *G11B 15/12* | (2006.01) |
| *G11B 19/02* | (2006.01) |
| *G11B 5/60* | (2006.01) |
| *G11B 5/00* | (2006.01) |

(52) U.S. Cl.
CPC .......... *G11B 5/6029* (2013.01); *G11B 5/6011* (2013.01); *G11B 2005/0021* (2013.01)

(58) Field of Classification Search
CPC ...... G11B 2005/0021; G11B 20/10388; G11B 5/012; G11B 5/455; G11B 5/6011; G11B 5/6029; G11B 5/6076; G11B 2005/0005; G11B 5/02; G11B 5/6064; G11B 2005/0013; G11B 5/3136; G11B 5/6005; G11B 5/607; G11B 19/04; G11B 20/10009; G11B 21/21; G11B 2220/20; G11B 27/36; G11B 20/10; G11B 20/10018; G11B 20/10027; G11B 20/10222; G11B 5/09; G11B 5/1278; G11B 5/3133; G11B 5/3143; G11B 5/6088; G11B 7/122; G11B 7/1263; G06F 3/06

See application file for complete search history.

(56) References Cited

U.S. PATENT DOCUMENTS

| | | | |
|---|---|---|---|
| 4,392,159 A | * | 7/1983 | Lemoine ............... G09B 5/065 348/500 |
| 6,018,789 A | | 1/2000 | Sokolov et al. |
| 6,065,095 A | | 5/2000 | Sokolov et al. |
| 6,078,452 A | | 6/2000 | Kittilson et al. |
| 6,081,447 A | | 6/2000 | Lofgren et al. |
| 6,092,149 A | | 7/2000 | Hicken et al. |
| 6,092,150 A | | 7/2000 | Sokolov et al. |
| 6,094,707 A | | 7/2000 | Sokolov et al. |
| 6,105,104 A | | 8/2000 | Guttmann et al. |
| 6,111,717 A | | 8/2000 | Cloke et al. |
| 6,145,052 A | | 11/2000 | Howe et al. |

(Continued)

*Primary Examiner* — Dionne H Pendleton
(74) *Attorney, Agent, or Firm* — Foley & Lardner LLP

(57) ABSTRACT

An apparatus includes: a media; a heat assisted magnetic recording (HAMR) head over the media; and control circuitry, coupled to the HAMR head, the control circuitry being configured to: receive a write command to write the media; apply a dynamic flying height (DFH) control before asserting a write gate of the HAMR head; assert the write gate to the HAMR head; and enable a flying height compensation mechanism to maintain a constant value of a flying height of the HAMR head over the media during a next assertion of the write gate.

41 Claims, 8 Drawing Sheets

(56) References Cited

U.S. PATENT DOCUMENTS

| | | |
|---|---|---|
| 6,175,893 B1 | 1/2001 | D'Souza et al. |
| 6,178,056 B1 | 1/2001 | Cloke et al. |
| 6,191,909 B1 | 2/2001 | Cloke et al. |
| 6,195,218 B1 | 2/2001 | Guttmann et al. |
| 6,205,494 B1 | 3/2001 | Williams |
| 6,208,477 B1 | 3/2001 | Cloke et al. |
| 6,223,303 B1 | 4/2001 | Billings et al. |
| 6,230,233 B1 | 5/2001 | Lofgren et al. |
| 6,246,346 B1 | 6/2001 | Cloke et al. |
| 6,249,393 B1 * | 6/2001 | Billings ............ G11B 19/04 360/31 |
| 6,256,695 B1 | 7/2001 | Williams |
| 6,262,857 B1 | 7/2001 | Hull et al. |
| 6,263,459 B1 | 7/2001 | Schibilla |
| 6,272,694 B1 | 8/2001 | Weaver et al. |
| 6,278,568 B1 | 8/2001 | Cloke et al. |
| 6,279,089 B1 | 8/2001 | Schibilla et al. |
| 6,289,484 B1 | 9/2001 | Rothberg et al. |
| 6,292,912 B1 | 9/2001 | Cloke et al. |
| 6,310,740 B1 | 10/2001 | Dunbar et al. |
| 6,317,850 B1 | 11/2001 | Rothberg |
| 6,327,106 B1 | 12/2001 | Rothberg |
| 6,337,778 B1 | 1/2002 | Gagne |
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,260 B2 | 9/2005 | Coffey et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,975,472 B2 | 12/2005 | Stover et al. |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |

(56) References Cited

U.S. PATENT DOCUMENTS

| | | |
|---|---|---|
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,099,097 B2 | 8/2006 | Hamaguchi et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,486,060 B1 | 2/2009 | Bennett |
| 7,496,493 B1 | 2/2009 | Stevens |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,647 B2 | 8/2011 | Lille |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |

(56) References Cited

U.S. PATENT DOCUMENTS

| | | |
|---|---|---|
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,339,919 B1 | 12/2012 | Lee |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,770 B1 | 4/2013 | O'Dell et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,441,909 B1 | 5/2013 | Thayamballi et al. |
| 8,456,980 B1 | 6/2013 | Thayamballi |
| 8,458,526 B2 | 6/2013 | Dalphy et al. |
| 8,462,466 B2 | 6/2013 | Huber |
| 8,467,151 B1 | 6/2013 | Huber |
| 8,483,027 B1 | 7/2013 | Mak et al. |
| 8,489,841 B1 | 7/2013 | Strecke et al. |
| 8,493,679 B1 | 7/2013 | Boguslawski et al. |
| 8,499,198 B1 | 7/2013 | Messenger et al. |
| 8,514,506 B1 | 8/2013 | Li et al. |
| 8,554,741 B1 | 10/2013 | Malina |
| 8,560,759 B1 | 10/2013 | Boyle et al. |
| 8,576,509 B1 | 11/2013 | Hogg |
| 8,576,511 B1 | 11/2013 | Coker et al. |
| 8,578,100 B1 | 11/2013 | Huynh et al. |
| 8,578,242 B1 | 11/2013 | Burton et al. |
| 8,582,223 B1 | 11/2013 | Garani et al. |
| 8,582,231 B1 | 11/2013 | Kermiche et al. |
| 8,589,773 B1 | 11/2013 | Wang et al. |
| 8,593,753 B1 | 11/2013 | Anderson |
| 8,599,512 B2 | 12/2013 | Hogg |
| 8,605,379 B1 | 12/2013 | Sun |
| 8,611,031 B1 | 12/2013 | Tan et al. |
| 8,611,032 B2 | 12/2013 | Champion et al. |
| 8,612,798 B1 | 12/2013 | Tsai |
| 8,619,383 B1 | 12/2013 | Jung et al. |
| 8,619,508 B1 | 12/2013 | Krichevsky et al. |
| 8,619,529 B1 | 12/2013 | Liew et al. |
| 8,621,115 B1 | 12/2013 | Bombet et al. |
| 8,621,133 B1 | 12/2013 | Boyle |
| 8,625,224 B1 | 1/2014 | Lin et al. |
| 8,625,225 B1 | 1/2014 | Wang |
| 8,626,463 B2 | 1/2014 | Stevens et al. |
| 8,630,052 B1 | 1/2014 | Jung et al. |
| 8,631,188 B1 | 1/2014 | Heath et al. |
| 8,635,412 B1 | 1/2014 | Wilshire |
| 8,661,193 B1 | 2/2014 | Cobos et al. |
| 8,665,547 B1 | 3/2014 | Yeo et al. |
| 8,667,248 B1 | 3/2014 | Neppalli |
| 8,670,205 B1 | 3/2014 | Malina et al. |
| 8,671,250 B2 | 3/2014 | Lee |
| 8,681,442 B2 | 3/2014 | Hogg |
| 8,681,445 B1 | 3/2014 | Kermiche et al. |
| 8,683,295 B1 | 3/2014 | Syu et al. |
| 8,687,306 B1 | 4/2014 | Coker et al. |
| 8,687,307 B1 | 4/2014 | Patton, III |
| 8,687,313 B2 | 4/2014 | Selvaraj |
| 8,693,133 B1 | 4/2014 | Lee et al. |
| 8,698,492 B1 | 4/2014 | Mak et al. |
| 8,699,171 B1 | 4/2014 | Boyle |
| 8,699,172 B1 | 4/2014 | Gunderson et al. |
| 8,711,500 B1 | 4/2014 | Fong et al. |
| 8,711,506 B1 | 4/2014 | Giovenzana et al. |
| 8,711,665 B1 | 4/2014 | Abdul Hamid |
| 8,717,694 B1 | 5/2014 | Liew et al. |
| 8,717,695 B1 | 5/2014 | Lin et al. |
| 8,730,612 B1 | 5/2014 | Haralson |
| 8,743,502 B1 | 6/2014 | Bonke et al. |
| 8,743,667 B1 | 6/2014 | Brockie et al. |
| 8,749,911 B1 | 6/2014 | Sun et al. |
| 8,753,146 B1 | 6/2014 | Szeremeta et al. |
| 8,755,136 B1 | 6/2014 | Ng et al. |
| 8,756,361 B1 | 6/2014 | Carlson et al. |
| 8,760,782 B1 | 6/2014 | Garani et al. |
| 8,760,792 B1 | 6/2014 | Tam |
| 8,769,593 B1 | 7/2014 | Schwartz et al. |
| 8,773,793 B1 | 7/2014 | McFadyen |
| 8,773,802 B1 | 7/2014 | Anderson et al. |
| 8,773,807 B1 | 7/2014 | Chia et al. |
| 8,773,957 B1 | 7/2014 | Champion et al. |
| 8,780,470 B1 | 7/2014 | Wang et al. |
| 8,782,334 B1 | 7/2014 | Boyle et al. |
| 8,786,976 B1 | 7/2014 | Kang et al. |
| 8,787,125 B1 | 7/2014 | Lee |
| 8,792,196 B1 | 7/2014 | Lee |
| 8,792,200 B1 | 7/2014 | Tam et al. |
| 8,797,667 B1 | 8/2014 | Barlow et al. |
| 8,799,977 B1 | 8/2014 | Kapner, III et al. |
| 8,817,413 B1 | 8/2014 | Knigge et al. |
| 8,817,584 B1 | 8/2014 | Selvaraj |
| 8,825,976 B1 | 9/2014 | Jones |
| 8,825,977 B1 | 9/2014 | Syu et al. |
| 8,902,718 B1 | 12/2014 | Ruan et al. |
| 2002/0036848 A1* | 3/2002 | Wilson .................. G11B 7/122 360/25 |
| 2006/0056091 A1* | 3/2006 | Nagano .................. G11B 5/02 360/55 |
| 2007/0230012 A1 | 10/2007 | Erden et al. |
| 2007/0268612 A1* | 11/2007 | Fitzpatrick ............ G11B 5/02 360/75 |
| 2007/0268613 A1* | 11/2007 | Fitzpatrick ............ G11B 5/02 360/75 |
| 2007/0279785 A1* | 12/2007 | Dolan ................... G11B 5/09 360/46 |
| 2009/0113702 A1 | 5/2009 | Hogg |
| 2009/0207519 A1 | 8/2009 | Erden et al. |
| 2010/0123967 A1 | 5/2010 | Batra et al. |
| 2010/0306551 A1 | 12/2010 | Meyer et al. |
| 2011/0226729 A1 | 9/2011 | Hogg |

(56) References Cited

U.S. PATENT DOCUMENTS

| | | |
|---|---|---|
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0324980 A1 | 12/2012 | Nguyen et al. |
| 2013/0293984 A1* | 11/2013 | Poss ................. G11B 5/607 360/75 |
| 2015/0062754 A1* | 3/2015 | Peng ................. G11B 5/607 360/235.4 |
| 2015/0318014 A1* | 11/2015 | Wilson ............ G11B 20/10027 360/46 |
| 2016/0343395 A1* | 11/2016 | Rausch ............... G11B 7/1263 |

\* cited by examiner

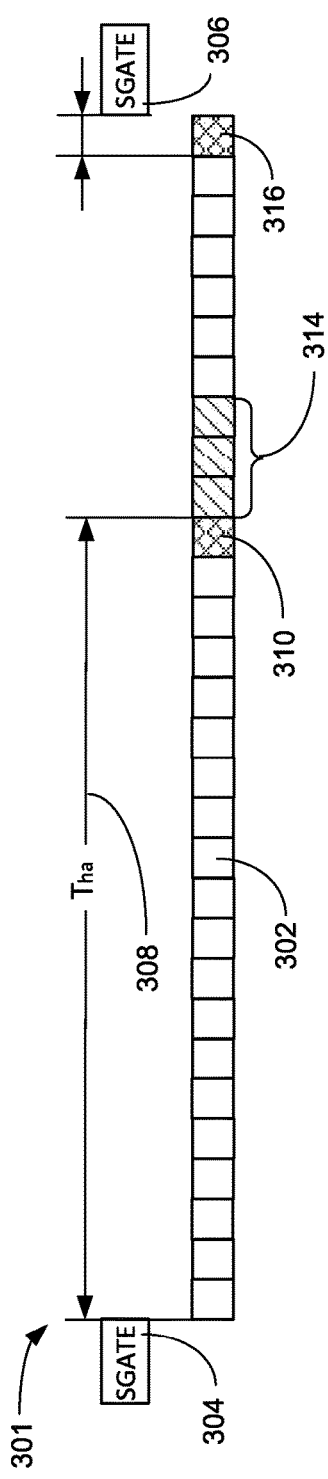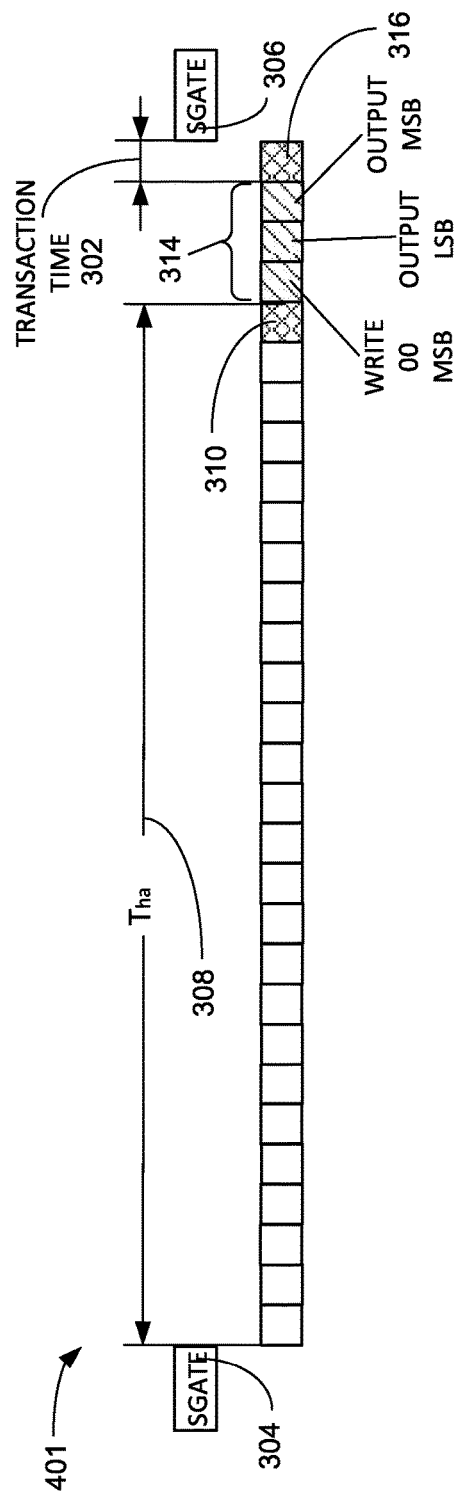

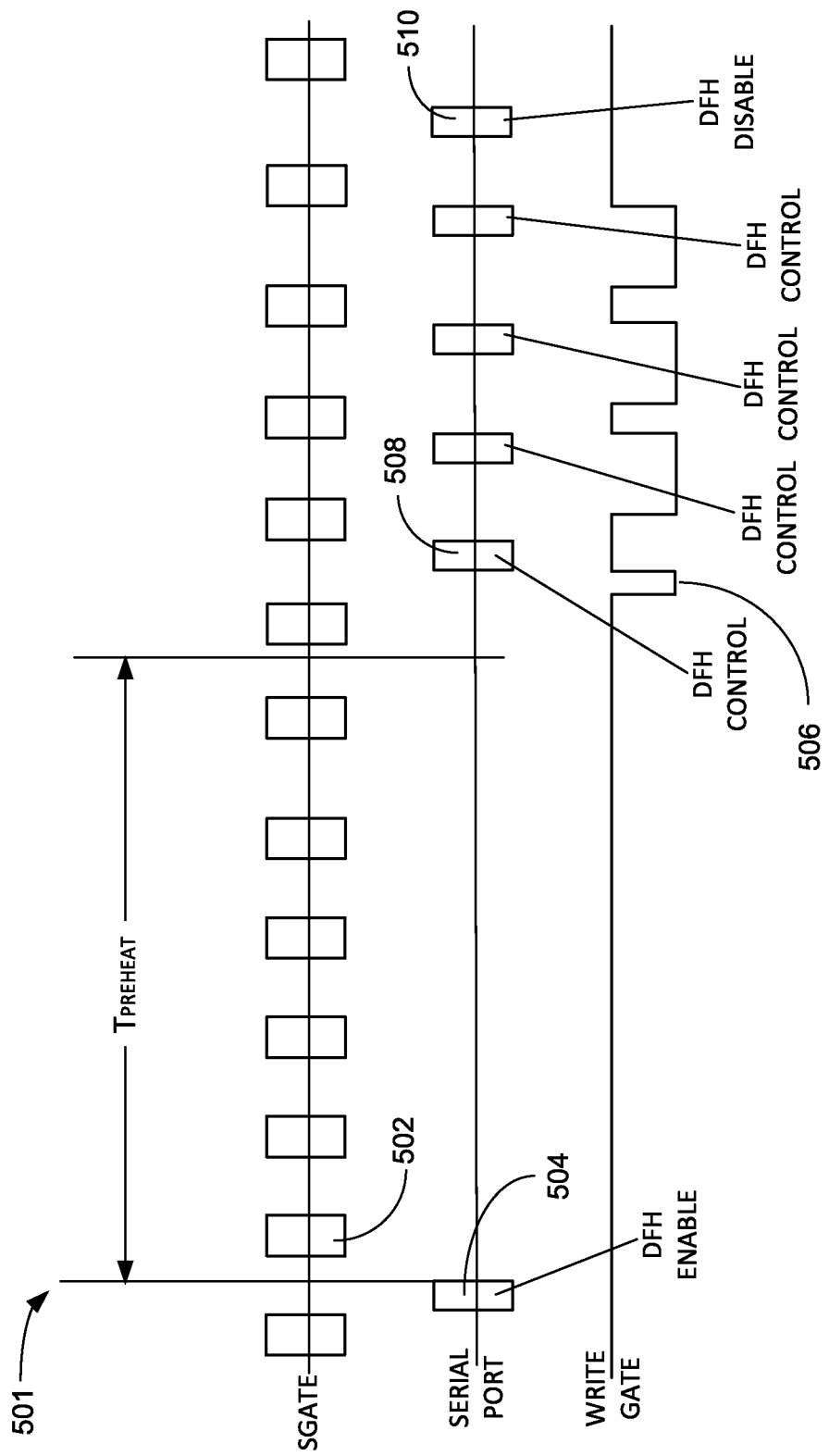

ELECTRONIC SYSTEM WITH HEAD MANAGEMENT MECHANISM AND METHOD OF OPERATION THEREOF

TECHNICAL FIELD

An embodiment relates generally to an electronic system, and more particularly to a system for head management.

BACKGROUND

Modern consumer and industrial electronic devices require storage of information, such as digital photographs, electronic mail, calendar, or contacts. These devices can be electronic systems, such as notebook computers, desktop computers, servers, televisions, and projectors, and are providing increasing levels of functionality to support modern life. Preserving the user data stored in the storage devices is of the utmost importance.

Different approaches have been used to record the data on magnetic media. Many recording head structures have evolved to provide the highest probability of performing a clean write of the data on the first attempt. This can have both performance and data reliability consequences. By assuring the data is correctly written on the magnetic media, the probability of burdensome data preservation processes can be reduced. The proper control of the recording head while writing data is of the utmost importance to prevent data on adjacent tracks from becoming corrupted due to unintended encroachment of the track boundaries.

Many of these data preservation processes can consume time, device resources, and can compete with interface operations. The cost associated with the data preservation processes must be mitigated in order to balance the device availability and the protection of the data stored there. Since the preservation of the data is the primary task of the device, availability of the interface functions for retrieving or storing data can be a primary focus and sometime to the detriment of the physical device, allowing such things as head wear, media damage, or component failures.

BRIEF DESCRIPTION OF THE DRAWINGS

FIG. 3 is a first example of a timing diagram of preamp communication of the head management mechanism in an embodiment.

FIG. 4 is a second example of a timing diagram of preamp communication of the head management mechanism in an embodiment.

FIG. 5 is a timing diagram of a dynamic flying height adjustment sequence of the head management mechanism in an embodiment.

DETAILED DESCRIPTION

Figure 1:
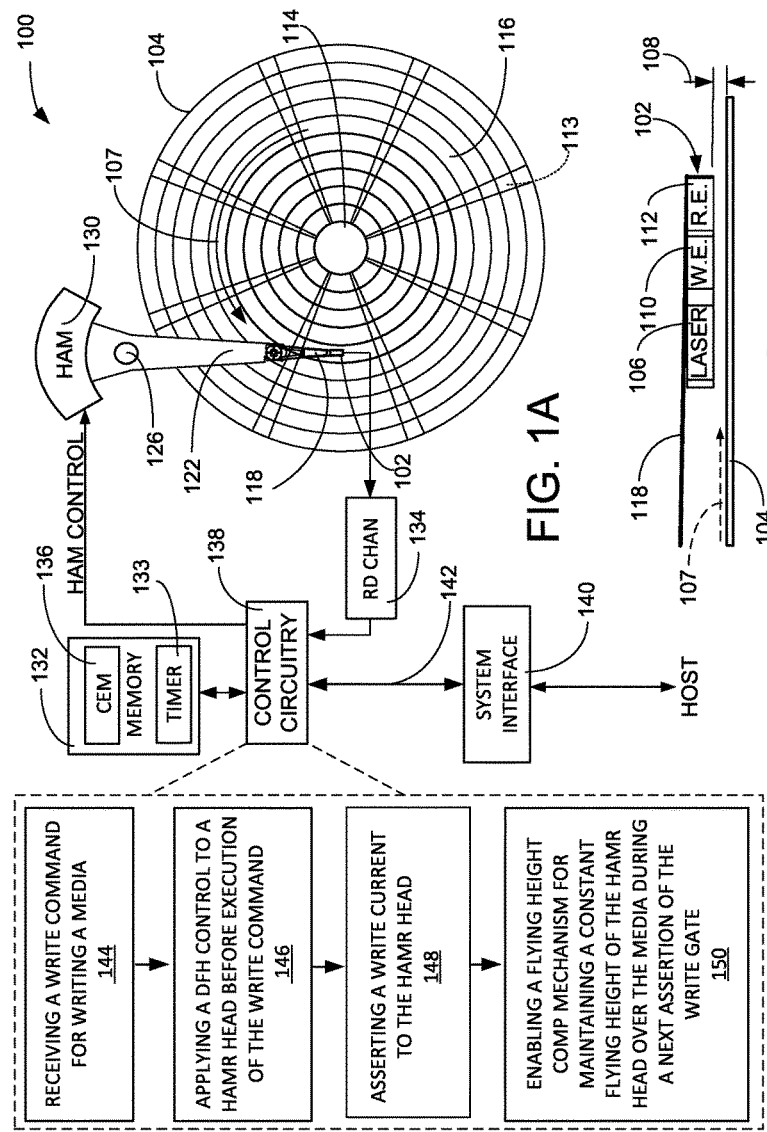
FIGS. 1A, 1B, and 1C show an operational diagram of an electronic system with head management according to one of the embodiments.

Storage systems can include storage devices, such as hard disk drives (HDD), hybrid drives, and optical storage devices. One of the critical items in the maintaining the data integrity is writing the data in the appropriate track location and at the correct magnetic level. The magnetic level is calibrated for a specific flying height of the head. If the flying height of the head is not maintained, there is a high probability that the data will not be properly written. Maintaining a properly flying height is especially challenging for a heat assisted magnetic recording (HAMR) head, due to the presence of a heating source such as a laser near the head.

A need still remains for an electronic system as various embodiments with head management mechanism for providing reliable data writing with a HAMR head. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

Certain embodiments have other steps or elements in addition to or in place of those mentioned above. The steps or elements will become apparent to those skilled in the art from a reading of the following detailed description when taken with reference to the accompanying drawings.

The following embodiments are described in sufficient detail to enable those skilled in the art to make and use the various embodiments. It is to be understood that other embodiments would be evident based on the present disclosure, and that system, process, or mechanical changes can be made without departing from the scope of an embodiment.

In the following description, numerous specific details are given to provide a thorough understanding of the various embodiments. However, it will be apparent that the various embodiments can be practiced without these specific details. In order to avoid obscuring an embodiment, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the various embodiments can be operated in any orientation.

Referring now to FIGS. 1A, 1B, and 1C, therein are shown an operational diagram of an electronic system 100 according to an embodiment. The electronic system 100 can represent an apparatus for one various embodiments. An embodiment depicted in FIGS. 1A, 1B, and 1C is shown as a hard disk drive, as an example, although it is understood that the electronic system 100 as the embodiment can be a tape drive, a solid-state hybrid disk drive, or other magnetic media-based storage device. Further for example, the electronic system 100 can represent a desktop computer, a notebook computer, a server, a tablet, a television, a household appliance, or other electronic systems utilizing magnetic media storage.

In an embodiment the electronic system 100 includes a heat assisted magnetic recording (HAMR) head 102 flying over a media 104. The HAMR head 102 can be mounted to a flex arm 118 attached to an actuator arm 122. The HAMR head 102 (FIG. 1B) includes a laser 106 for heating the media 104 during part of a write process (e.g., the head is part of an Energy-Assisted Magnetic Recording (EAMR) drive). A flying height 108 can be adjusted (e.g., by use of a heater element in the head not shown in FIG. 1B) while writing data to the media 104 or as an error recovery process during reading from the media 104. The flying height 108 can have a constant value, such as the designed optimum spacing, that is the ideal spacing between the media 104 and the HAMR head 102 for best recording of the data. The flying height 108 can maintain the constant value in order to maintain data reliability. Also in an embodiment of FIG. 1B, the HAMR head 102 comprises a write element 110 (e.g., an inductive coil) and a read element 112 (e.g., a magnetoresistive read element).

The media 104 is a structure for storing information. For example, the media 104 can be made of an aluminum alloy, ceramic/glass, or a similar non-magnetic material. The top and bottom surfaces of the media 104 can be covered with magnetic material deposited on one or both sides of the media 104 to form a coating layer capable of magnetization. As an example, the media 104 can be a disk platter for one embodiment of the electronic system 100 as a rotating storage system, such as a hard disk drive (HDD). As a further example, the media 104 can be a linear magnetic strip for one embodiment of the electronic system 100 as a linear storage system, such as a tape drive.

The laser 106, as an example, can be a laser diode or other solid-state based lasers. In addition, embodiments can employ any suitable techniques for focusing the laser 106 on the media 104, such as a suitable waveguide, magnifying lens, or other suitable optics. The laser 106 is increased to a write power in order to heat the disk, thereby decreasing the coercivity of the media 104 so that the data is written more reliably.

The spindle motor 114 can rotate the media 104, about a center of the media 104, at constant or varying speed 107. For illustrative purposes, the spindle motor 114 is described as a motor for a rotation, although it is understood that the spindle motor 114 can be other actuating motors for a tape drive, as an example.

As examples, a head actuation motor 130 can be a voice coil motor assembly, a stepper motor assembly, or a combination thereof. The head actuation motor 130 can generate a torque or force for positioning the HAMR head 102.

A tapered end of the flex arm 118 can include the HAMR head 102. The flex arm 118 can be mounted to the actuator arm 122, which is pivoted around a bearing assembly 126 by the torque generated by the head actuation motor 130. The HAMR head 102 can include a single instance of the write element 110 and a single instance of the read element 112 that is narrower than the write element 110. The HAMR head 102 can fly over the media 104 at a dynamically adjustable span of the flying height 108, which represents a vertical displacement between the HAMR head 102 and the media 104. The HAMR head 102 can be positioned by the flex arm 118 and the actuator arm 122 and can have the flying height 108 adjusted by control circuitry 138.

The HAMR head 102 can be positioned over the media 104 along an arc shaped path between an inner diameter of the media 104 and outer diameter of the media 104. For illustrative purposes, the actuator arm 122 and the head actuation motor 130 are configured for rotary movement of the HAMR head 102. The actuator arm 122 and the head actuation motor 130 can be configured to have a different movement. For example, the actuator arm 122 and the head actuation motor 130 could be configured to have a linear movement resulting in the HAMR head 102 traveling along a radius of the media 104.

The HAMR head 102 can be positioned over the media 104 to create magnetic transitions or detect magnetic transitions from the coating layer that can be used to representing written data or read data, respectively. The position of the HAMR head 102 and the speed 107 of the media 104 can be controlled by the control circuitry 138. Examples of the control circuitry 138 can include a processor, an application specific integrated circuit (ASIC) an embedded processor, a microprocessor, a hardware control logic, a hardware finite state machine (FSM), a digital signal processor (DSP), digital circuitry, analog circuitry, optical circuitry, or a combination thereof. The control circuitry 138 can also access a memory 132, such as a volatile memory, a non-volatile memory, or a combination thereof. For example, the memory 132 can be non-volatile random access memory (NVRAM) or Flash memory or a volatile storage can be static random access memory (SRAM) or dynamic random access memory (DRAM).

A system interface 140 can couple the control circuitry 138 to a host or host electronics (not shown). The system interface 140 can transfer write commands 142 between the host electronics and the control circuitry 138. The write commands 142 can be encoded or decoded by the control circuitry 138 in preparation for transfer to or from the media 104. It is understood that other commands can be received through the system interface 140, but these are not discussed in order to maintain focus on the embodiments of the invention.

The control circuitry 138 can be configured to control the spindle motor 114 for adjusting the speed 107 of the media 104. The control circuitry 138 can be configured to cause the HAMR head 102 to move relative to the media 104, or vice versa. The media 104 can include a plurality of servo sectors 113, distributed through data tracks 116, that can be read through the read channel 134 to allow the control circuitry 138 to control the positioning of the HAMR head 102 relative to the data tracks 116. While the servo sectors 113 are shown a radial pattern through the data tracks 116, other configurations are possible. The servo sectors 113 can contain information to identify the data track 116 by a number and provide a means to determine the flying height 108 of the HAMR head 102.

The control circuitry 138 can also be configured to control the flow of information to the HAMR head 102 for writing to the data tracks 116 of the media 104. The information sent to the HAMR head 102 can include the preconditioning pattern, direct current erase signals, user data, or a combination thereof.

The control circuitry 138 can maintain a timer 133 for metering the operations of the electronic system 100. The timer 133 can be a software timer or a hardware timer available to or a part of the control circuitry 138. As such, while the timer 133 is depicted as being within memory 132 in FIG. 1A, in certain embodiments it can be implemented apart from a memory such as the memory 132 (e.g., in the case of a hardware timer).

The timer 133 can be a compound timer capable of monitoring several events concurrently. By way of an example, the timer 133 can implement a four second command time-out timer to measure when a host command, such as a read or write operation, is required to be executed to the media 104. Any failure, by the electronic system 100, to complete the host command and provide status prior to the command time-out can result in the host asserting a system reset to initialize the electronic system 100.

For further example, the timer 133 can be a special application timer as determined by the control circuitry 138 to respond to environmental conditions, such as temperature and humidity. The timer 133 can keep track of multiple events concurrently. The control circuitry 138 can use various aspects of the timer 133 to trigger memory management processes as well as media maintenance processes. The control circuitry 138 can dynamically manage the timer 133 to accommodate the requirements of the electronic system 100 concurrently.

As another example of various embodiments, the timer 133 can be used to control intervals for several concurrent events and can alert the control circuitry 138 to active interface states, idle disk states, and environmental response states. The control circuitry 138 can configure the timer 133 to provide identifiers for each of the events being monitored by the timer 133. By way of an example, the control circuitry 138 can utilize the timer 133 to keep track of the operational hours of the electronic system 100, while also monitoring interface idle time. The control circuitry 138 can monitor the environmental conditions and the operational hours provided by the timer 133 in order manage certain media maintenance operations, such as background data verification and media lube wear leveling.

A command execution memory (CEM) 136 can be allocated in the memory 132 or implemented as a separate memory device. The CEM 136 can be dynamic random access memory (DRAM), a static random access memory (SRAM), an embedded register file, or a non-volatile memory. The CEM 136 can act as a repository for the dynamic flying height control commands associated with each of the write command 142. The CEM 136 can be a dual-port memory that can be accessed out of order, which will allow reordering of command execution by the control circuitry 138.

A closed loop circuit, for monitoring and controlling the flying height 108 of the HAMR head 102, can be formed by the read channel 134 and a dynamic flying height control mechanism in the control circuitry 138. The HAMR head 102 can read a standard reference signal in the servo sector 113 that provides verification of the flying height 108. The control circuitry 138 can make real-time adjustments of the flying height 108 based on the feedback from reading the servo sector 113 and the analysis of the commands queued in the CEM 136.

In one embodiment, the electronic system 100 further comprises control circuitry 138 configured to execute the flow diagram of FIG. 1C. As an example, blocks 144 to 150 can represent the flow diagram where an embodiment is employing a command management mechanism for maintaining data integrity.

Block 144 shows receiving a write command 142 for writing the media 104, for execution by the electronic system 100, such as a manufacturing test fixture, a hard disk drive, a tape drive, a hybrid drive, or an optical drive.

Block 146 shows applying a dynamic flying height (DFH) control to a heat assisted magnetic recording (HAMR) head 102 before execution of the write command 142. The assertion of the DFH control can adjust the flying height 108 of the HAMR head 102 over the media 104.

Block 148 shows asserting a write current to the HAMR head 102. The assertion of the write current marks the beginning of the data written to the media. The write gate is automatically negated during the servo sectors 113.

Block 150 shows enabling a flying height compensation mechanism for maintaining a constant flying height 108 of the HAMR head 102 over the media 104 during a next assertion of the write gate.

It has been discovered that an embodiment of the electronic system 100 can provide reliable writing of data on the media 104 by maintaining a constant value of the flying height 108 over the media 104. It is understood that too high a value of the flying height 108 can cause a weak recording of the data that is difficult to read back. It is also understood that too low a value of the flying height 108 can cause oversaturation of the media 104 that can cause inter-symbol interference and bit shifting. By maintaining an accurate value of the flying height 108, the electronic system 100 can maintain data reliability and enhance performance because the data only has to be written once.

Figure 2:
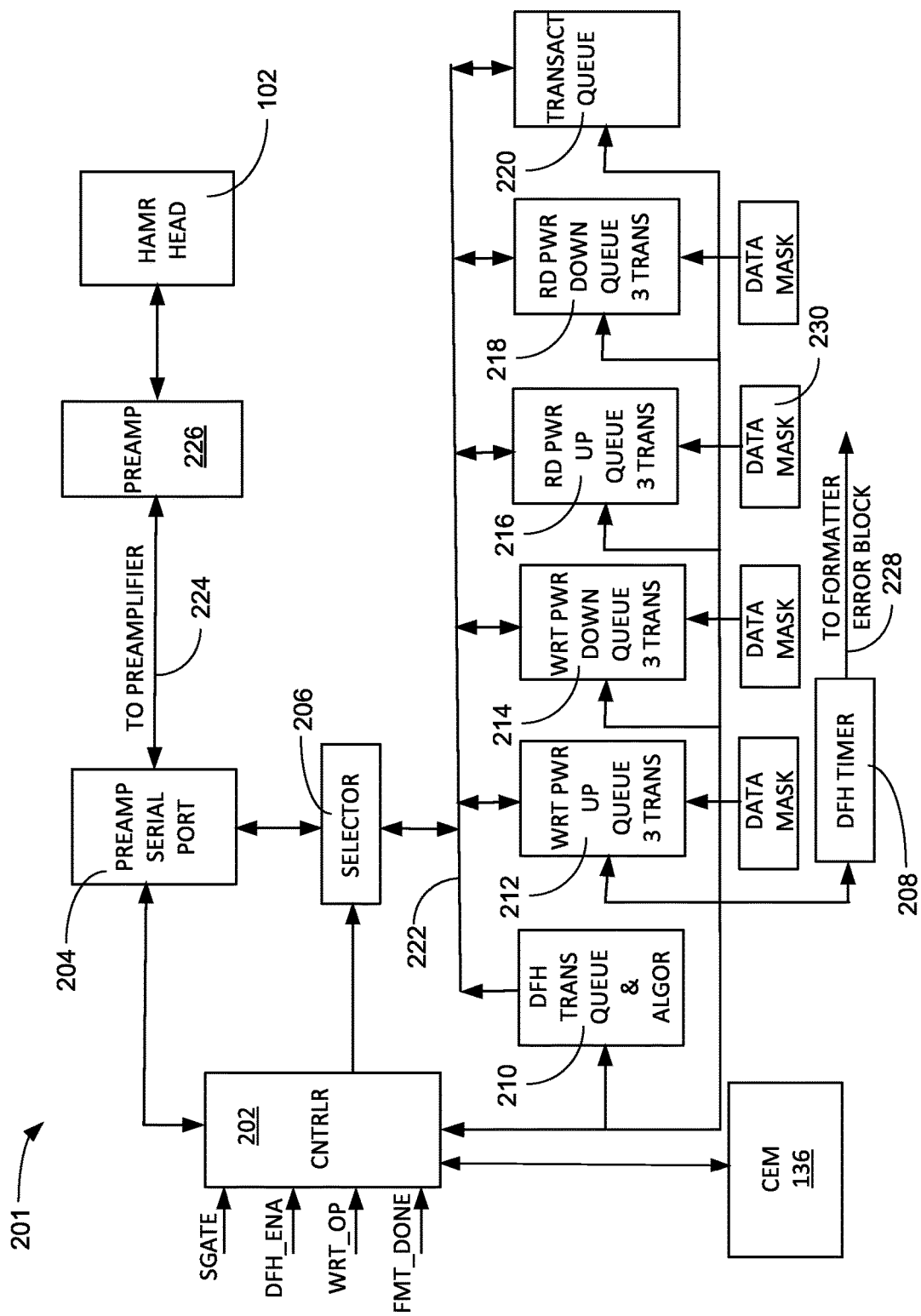
FIG. 2 is a functional block diagram of a dynamic flying height (DFH) control mechanism in an embodiment.

Referring now to FIG. 2, therein is shown a functional block diagram of a dynamic flying height (DFH) control mechanism 201 in an embodiment. The functional block diagram of the dynamic flying height (DFH) control mechanism 201 depicts a DFH controller 202 couples to a preamplifier serial port 204, a source selector 206, a dynamic flying height (DFH) timer 208, a DFH transaction unit 210, a write power-up unit 212, a write power-down unit 214, a read power-up unit 216, a read power-down unit 218, and a transaction unit 220. The functional units can be implemented by a combination of firmware and hardware as appropriate for the operation of the dynamic flying height (DFH) control mechanism 201.

The DFH controller 202 can be a processor, an embedded processor core, a state machine, combinational logic, or a combination thereof. The DFH controller 202 can monitor complex trigger events based on the format of the data tracks 116 of FIG. 1A and the servo sectors 113 of FIG. 1A, in order to manage the preamplifier serial port 204 and the source selector 206 for the execution of a specific command. The DFH controller 202 can access the CEM 136 to retrieve the details of the write command 142 of FIG. 1A in the execution stream. The DFH controller 202 can provide details of the command stream from the CEM 136 to the DFH transaction unit 210 for calculation of serial port data 222 provided to the source selector 206.

The DFH transaction unit 210 can be a hardware circuitry for calculating the control command values applied to the HAMR head 102 based on an operational history and expected command execution. The DFH transaction unit 210 can include a hardware state machine, non-volatile memory, analog circuitry, a co-processor, ASIC, or a combination thereof. The DFH controller 202 can activate the source selector 206 in order to communicate a serial command stream 224 from the preamplifier serial port 204 to a preamp 226 that can control the operational features of the HAMR head 102.

The DFH transaction unit 210 can have knowledge of the characteristics of the operational features of the HAMR head 102. The knowledge can be in the form of an algorithm that can predict the size change of the operational features of the HAMR head 102, such as a writer protrusion and a laser protrusion, which can be caused by power applied to the regions of the HAMR head 102 during normal operations. These protrusions from the regions of the HAMR head 102 can extend into the flying height 108 of FIG. 1B and cause data reliability issues by writing the data at an incorrect flying height or contacting the media 104. Each of the HAMR head 102 in the electronic system 100 of FIG. 1A can have a slightly different response that can be identified and adjusted in the manufacturing process, and the variances can be taken into account by the DFH transaction unit 210.

The DFH transaction unit 210 can operate in conjunction with the DFH controller 202 and the CEM 136 in order to establish a command queue that can accommodate on-the-fly reordering of the write commands 142 of FIG. 1A without firmware intervention. The DFH transaction unit 210 can calculate the appropriate values of the flying height control to apply to the serial port 204 in order to maintain the correct value of the flying height 108 throughout the reordering of the write commands 142.

Each of the write power-up unit 212, the write power-down unit 214, the read power-up unit 216, and the read power-down unit 218 can provide set-up to the preamp 226 in order to initiate and terminate the associated command. The DFH controller 202 can coordinate the selection of the serial port data 222 through the source selector 206. The DFH timer 208 can be used by the DFH controller 202 in order to assert write related exceptions, such as write fault. The DFH timer 208 can assert a set-up exception 228 if the DFH controller 202 is unable to complete the download of the serial command stream 224 to the preamp 226. The assertion of the set-up exception 228 can cause a write fault, which leads to, for example, a 1 revolution delay in the execution of the write command 142 in one embodiment. The DFH timer 208 can provide intra-wedge timing for the DFH controller 202.

The transaction unit 220 can maintain a history of the changes in the flying height 108. The DFH controller 202 can read the history of DFH controls, from the transaction unit 220, in order to detect patterns in the changes of the flying height 108 for specific types of the write commands 142 and adapt the algorithm for adjusting the DFH controls. For example, a type of the write command 142 with skip mask operations can use a data mask register 230 to affect the DFH controls while skip mask operations to write only specific data sectors in the data track 116 are performed.

Referring now to FIG. 3, therein is shown a first example of a timing diagram 301 of preamp communication of the head management mechanism in an embodiment. The timing diagram 301 depicts a number of transaction times 302 that can be serviced between a first servo sector 304 and a second servo sector 306. It is understood that the number of the transaction times 302 is an example and a different number of the transaction times 302 can be implemented.

A head adjustment time ($T_{ha}$) 308 can be set in the DFH timer 208 of FIG. 2 to alert the DFH controller 202 of FIG. 2 to initiate a control adjustment command through the preamp 226 of FIG. 2. A serial port lockout 310 at the beginning of the transaction time can be issued to the preamp 226 in preparation for a control sequence transfer 314 including a DFH initialize, which can write, for example, a value of the DFH control register within the preamp 226, and a DFH control value.

In this instance, the HAMR head 102 of FIG. 1B would initiate an adjustment of the flying height 108 of FIG. 1B, based on the control sequence transfer 314, prior to the second servo sector 306. A serial port release 316 can be issued to the preamp 226 to allow other transactions through the preamplifier serial port 204. Depending on the history of the control sequence transfer 314 issued to the HAMR head 102, as provided by the transaction unit 220 of FIG. 2, the HAMR head 102 can take up to 400 microseconds to achieve the proper adjustment of the flying height 108. The timing of the head adjustment time 308 can be modified to allow the HAMR head 102 to reach the proper flying height 108 before the write sequence is initiated to write the data track 116 of FIG. 1A.

It has been discovered that the reordering of the write commands 142 of FIG. 1A can be accommodated with very short notice through the CEM 136 of FIG. 1A and the DFH controller 202. The DFH transaction unit 210 of FIG. 2 can adjust the control sequence transfer 314 based on the reorder of write commands 142.

Referring now to FIG. 4, therein is shown a second example of a timing diagram of preamp communication of the head management mechanism in an embodiment. The timing diagram 401 depicts a number of the transaction times 302 that can be serviced between the first servo sector 304 and the second servo sector 306. It is understood that the number of the transaction times 302 is an example and a different number of the transaction times 302 can be implemented.

The head adjustment time ($T_{ha}$) 308 can be set in the DFH timer 208 of FIG. 2 to alert the DFH controller 202 of FIG. 2 to initiate the control command through the preamp 226 of FIG. 2. The serial port lockout at transaction time 310 can be issued to the preamp 226 in preparation for the control sequence transfer 314 including a control initialize, which can write, for example, the value of the DFH control register within the preamp 226, and the DFH control value issued to the preamp 226.

In this instance, the HAMR head 102 would initiate an adjustment of the flying height 108 of FIG. 1A based on the DFH control value after the second servo sector 306 has been serviced. A serial port release at transaction time 316 can be used to allow other transactions through the preamplifier serial port 204. Depending on the history of operations of the HAMR head 102, as provided by the transaction unit 220 of FIG. 2, the HAMR head 102 can take up to 400 microseconds to achieve the proper adjustment of the flying height 108. The timing of the head adjustment time 308 can be modified to allow the HAMR head 102 to reach the proper flying height 108 before the write sequence is initiated to write the data track 116 of FIG. 1A.

Referring now to FIG. 5, therein is shown a timing diagram of a dynamic flying height adjustment sequence 501 of the head management mechanism in an embodiment. The timing diagram of a dynamic flying height adjustment sequence 501 depicts a series of servo gates 502. The preamplifier serial port 204 of FIG. 2 can pass a DFH enable sequence 504, which can be selected from the write power-up unit 212 of FIG. 2 by the DFH controller 202 of FIG. 2. The HAMR head 102 of FIG. 1B can pre-heat for several of the servo gates 502. The DFH timer 208 can notify the DFH controller 202 that the HAMR head 102 has reached the appropriate flying height 108 of FIG. 1B based on the historical performance monitored in the manufacturing process.

A write gate 506 can be asserted to actively record the data track 116 of FIG. 1A. A short duration of the write gate 506 can indicate that not all of the data sectors available between the servo gates 502 are to be written. This can be caused by a skip mask operation as indicated in the data mask register 230 of FIG. 2. The shortened write cycle can indicate that flying height 108 of FIG. 1B should be adjusted.

The DFH controller 202 of FIG. 2 can initiate the DFH control adjustment command through the preamp 226 of FIG. 2 in order to assure the HAMR head 102 of FIG. 1A is at the correct value of the flying height 108. Depending on the timing between the servo gates 502, a dynamic flying height (DFH) command 508 can impact the flying height 108 prior to the second servo sector 306 as shown in FIG. 3 or after the second servo sector 306 as shown in FIG. 4.

The write gate 506 is negated during the processing of the servo gate 502. This prevents any of the calibration and identification data stored in the servo sectors 113 of FIG. 1A from being overwritten. The DFH controller 202 can develop a complex timing trigger in order to issue the next DFH command 508. The DFH controller 202 can rely on the detection of the servo gates 502, input from the DFH timer 208 of FIG. 2, the write gate 506, DFH enable lines, or a combination thereof in conjunction with the contents of the CEM 136 to manage the issuing of the DFH command 508.

The DFH controller 202 can also use the DFH timer 208 as a failsafe to assure the commands from the CEM 136 are executed correctly. If the DFH command 508 is not queued correctly or misses the critical timing relative to the servo gates 502, the DFH timer can assert the set-up exception 228, which can cause a write fault that will prevent the writing of the next data sector because it blocks the assertion of the write gates 502.

When the DFH transaction unit 210 of FIG. 2 has issued all of the DFH commands 508 associated with the current execution of the write command 142 of FIG. 1A, the DFH controller 202 can issue a DFH control disable sequence 510 that will allow the HAMR head 102 to adjust to a neutral value of the flying height 108.

It is understood that the issuing of the DFH control disable sequence 510 can be delayed if a sequential write command or a near sequential write command is loaded into the CEM 136. The DFH controller 202 can determine when it is appropriate to issue the DFH control disable sequence 510 to terminate the DFH control for the current sequence.

Figure 6:
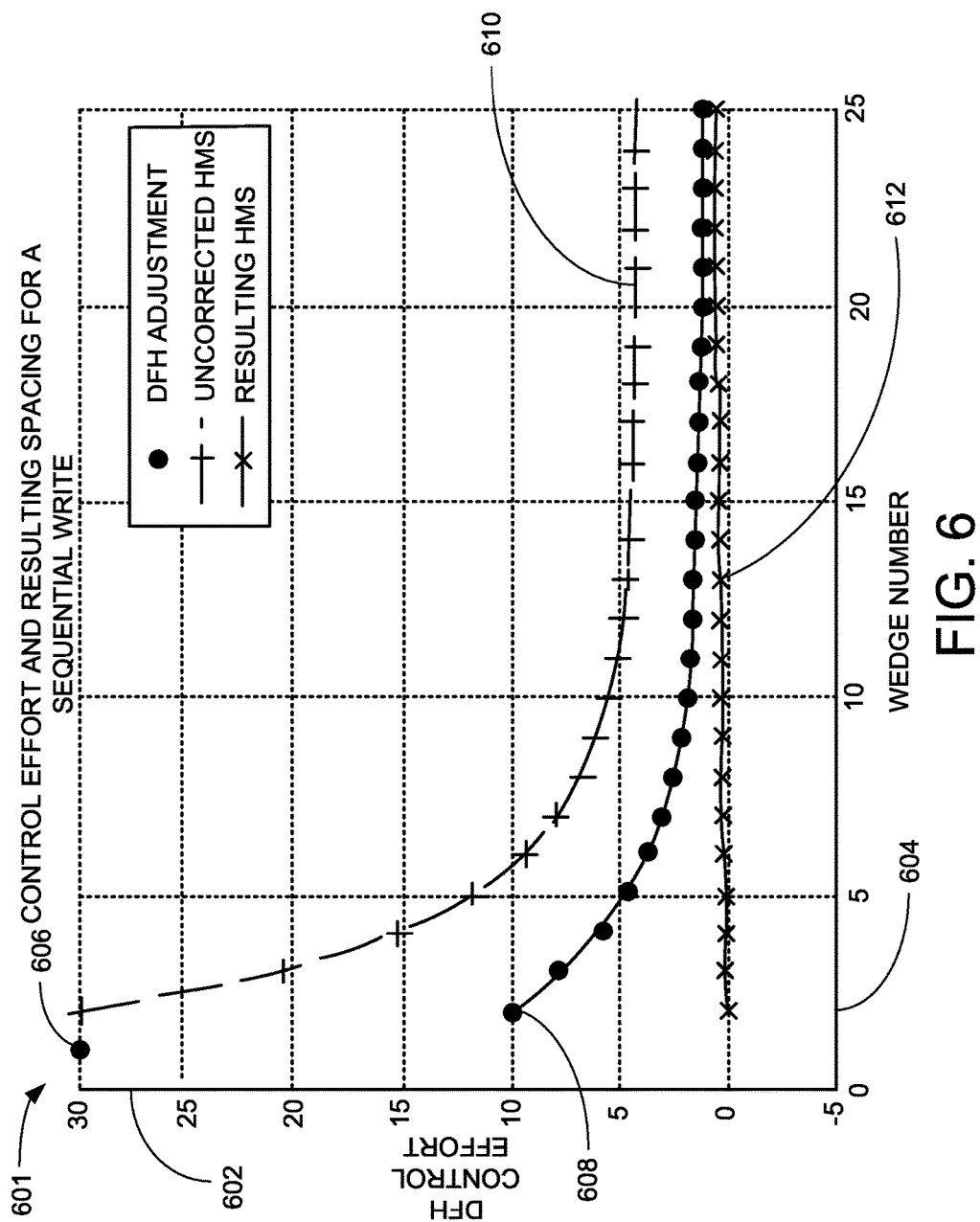
FIG. 6 is a graph of dynamic flying height (DFH) control adjustments during a write command of a sequential write in an embodiment.

Referring now to FIG. 6, therein is shown a graph of DFH control adjustments 601 and resulting head media spacing (HMS) during a write command 142 of a sequential write in an embodiment. The graph of the DFH control adjustments 601 depicts a DFH control power 602, as indicated in the y-axis of the graph that can be asserted for each of the servo gates 502 of FIG. 5 as indicated by the servo wedge number 604, in the x-axis of the graph. The write command 142 of FIG. 1A can require the first of the data to be written after the fifth of the servo wedge number 604 and write continuously across the remaining of the servo wedge number 604 in the data track 116 of FIG. 1A.

An initial value 606 of the DFH control power 602 can be set to a high value, by way of an example a DFH heater can be set to 30 mW in order to quickly adjust the flying height 108 of FIG. 1B of the HAMR head 102 of FIG. 1A. Each of the subsequent values 608 of the DFH control power 602 can be reduced based on the change in the flying height 108 detected during the processing of the servo sectors 113 of FIG. 1A. It is understood that the initial value 606 is an example only and different implementations of the HAMR head 102 can use different magnitudes of the DFH control power 602.

The operation of the HAMR head 102 across all of the data sectors of the data track 116 can cause protrusions in the surface of the HAMR head 102. The heat generated by the write element 110 of FIG. 1B can cause the surface of the HAMR head 102 to expand and protrude into the flying height 108. A similar phenomena can occur to the laser 106 of FIG. 1B. The number of protrusions and their growth rate can be characterized during the manufacturing process. The protrusion characteristics can be captured in the DFH transaction unit 210 of FIG. 2 in order to calculate the projected adjustments required to be applied by the DFH controller 202 of FIG. 2 over the course of the write command 142.

The reduction in the subsequent values 608 of the DFH control power 602 can compensate for the protrusions developed by the power of the write element 110 and the laser 106 during the write operation. The DFH transaction unit 210 calculates the power required to maintain the constant value of the flying height 108.

These protrusions can come from the laser 106, the scattered light in the waveguide that directs the power of the laser 106, and/or the near field transducer (NFT). Unlike the DFH control power 602, full laser power cannot be applied prior to the assertion of the write gate 506 of FIG. 5, because the heat generated could erase the previously written data on the data track 116. Therefore, to maintain a constant value of the flying height 108, a combination of a lower current in the laser 106 and a higher value of the DFH control power 602 is used in one embodiment. As the laser 106 protrudes, the DFH control power 602 in one embodiment needs to be reduced, and vice versa.

An uncorrected head-media spacing (HMS) curve 610 can show the trend of the flying height 108. The uncorrected HMS curve 610 shows a constant downward slope caused by the growing protrusions from the laser 106 and the write element 110. By adjusting the amount of the DFH control power 602, calculated as being necessary by the DFH transaction unit 210, an actual flying height curve 612 actually shows a slight rising trajectory, which compensates for the protrusions.

It is understood that the dynamic adjustment of the DFH control power 602, based on a priori knowledge of the protrusion growth and shrinking provided by a historic use model developed in the manufacturing process, can maintain the flying height 108 at a constant value throughout the write process. In the alternative, every write command 142 would require a verification of the data track 116 after it was written. The alternative process would protect the data at the expense of the operational performance of the electronic system 100 of FIG. 1A, which would be unacceptable.

Figure 7:
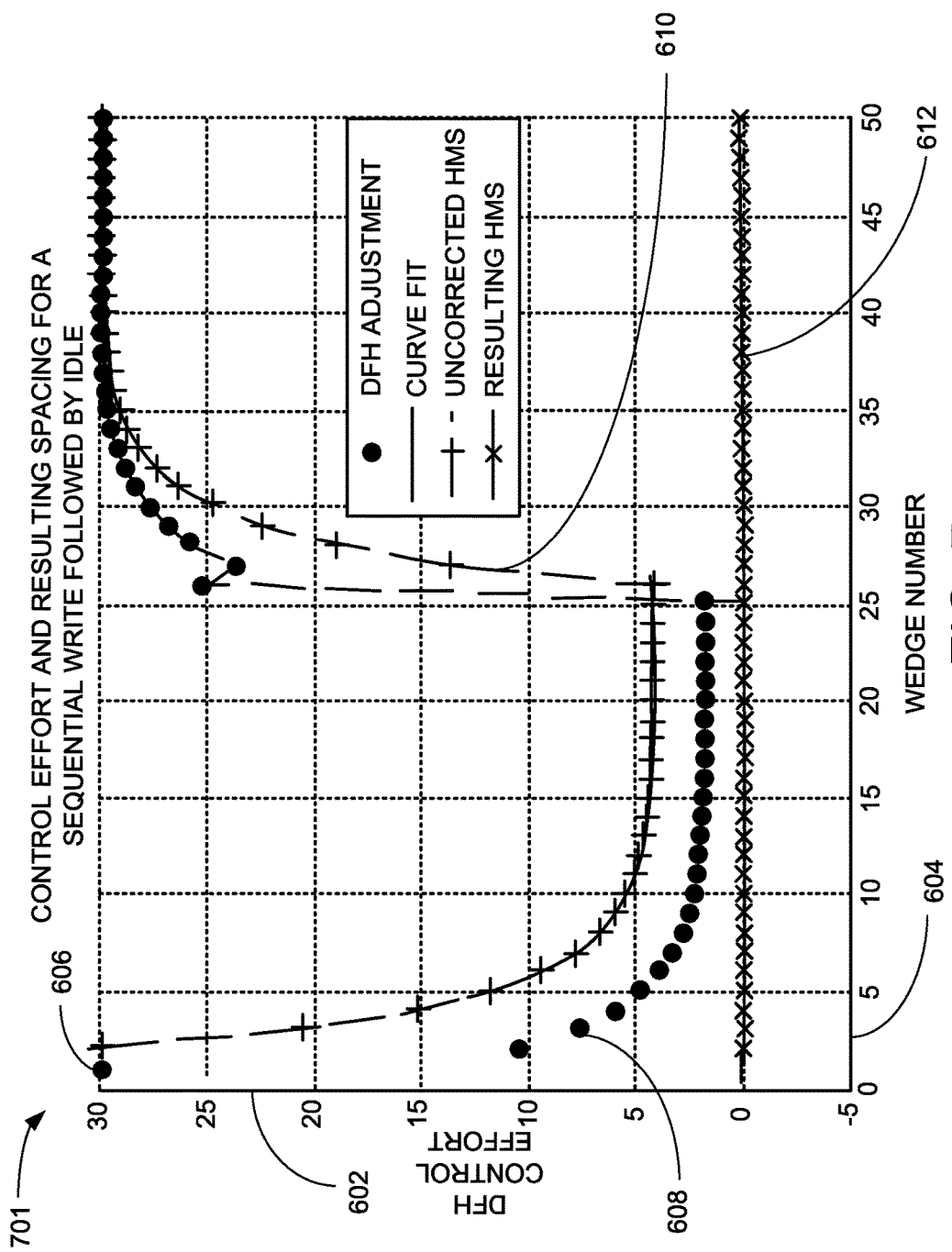
FIG. 7 is a graph of DFH control adjustments during a write command of a sequential write followed by an idle in an embodiment.

Referring now to FIG. 7, therein is shown a graph of DFH control adjustments 701 and resulting HMS during the write command 142 of a sequential write followed by an idle in an embodiment. The graph of DFH control adjustments 701 depicts the DFH control power 602, as indicated in the y-axis of the graph, can be asserted for each of the servo gates 502 of FIG. 5 as indicated by the servo wedge number 604, in the x-axis of the graph. The write command 142 of FIG. 1A can require the first of the data to be written after the fifth of the servo wedge number 604 and write until the $25^{th}$ of the servo wedge number 604 in the data track 116 of FIG. 1A.

The initial value 606 of the DFH control power 602 can be set to a high value, by way of an example a DFH heater can be set to 30 mW in order to quickly adjust the flying height 108 of FIG. 1B of the HAMR head 102 of FIG. 1B. Each of the subsequent values 608 of the DFH control power 602 can be reduced based on the change in the flying height 108 detected during the processing of the servo sectors 113 of FIG. 1A. It is understood that the initial value 606 is an example only and different implementations of the HAMR head 102 can use different magnitudes of the DFH control power 602.

Upon completing the write command 142 at the servo wedge number 604 number 25, the subsequent values 608 of the DFH control power 602 can be rapidly increased in order to maintain the correct value of the flying height 108. The increase in the subsequent values 608 of the DFH control power 602 is required because the laser 106 and the write element 110 are no longer active and their protrusions will shrink back into the HAMR head 102. The value of the DFH control power 602 can be calculated by the DFH transaction unit 210 of FIG. 2.

It is understood that the flying height 108 can be determined during the processing of the servo sector 113 of FIG. 1A, which can contain a standard amplitude signal that can be analyzed to determine the actual value of the flying height 108.

The uncorrected head-media spacing (HMS) curve 610 can show the trend of the flying height 108. The uncorrected HMS curve 610 shows a constant downward slope, caused by the growing protrusions from the laser 106 and the write element 110, during the execution of the write command 142. By adjusting the amount of the DFH control power 602, calculated as being necessary by the DFH transaction unit 210, an actual flying height curve 612 can show a slight rising trajectory, which compensates for the protrusions.

Figure 8:
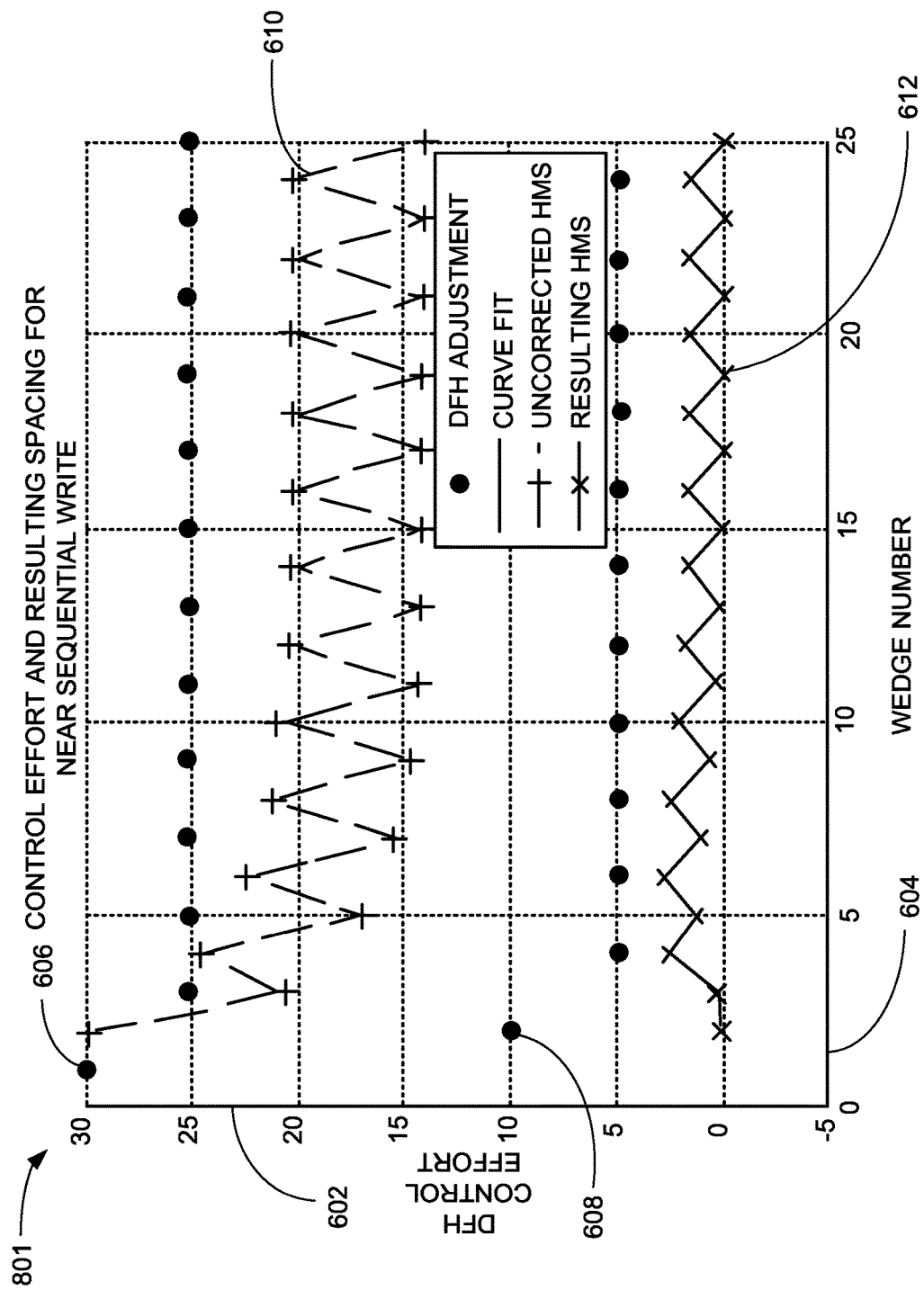
FIG. 8 is a graph of DFH control adjustments during a write command of a full data track using a skip-mask in a near sequential write in an embodiment.

Referring now to FIG. 8, therein is shown a graph of DFH control adjustments 801 and resulting HMS during a write command of a full data track using a skip-mask in a near sequential write in an embodiment. The graph of the DFH control adjustments 801 depicts the DFH control power 602, as indicated in the y-axis of the graph, that can be asserted for each of the servo gates 502 of FIG. 5 as indicated by the servo wedge number 604, in the x-axis of the graph. The write command 142 of FIG. 1A can require a skip mask that blocks the write of all of the data sectors in every other of the wedges between the servo sectors 113 of FIG. 1A.

The initial value 606 of the DFH control power 602 can be set to a high value, by way of an example a DFH heater can be set to 30 mW in order to quickly adjust the flying height 108 of FIG. 1B of the HAMR head 102 of FIG. 1B. Each of the subsequent values 608 of the DFH control power 602 can be modified by the DFH transaction unit 210 of FIG. 2 based on the change in the flying height 108 detected during the processing of the servo sectors 113 and the skip mask criteria for the write command 142. It is understood that the initial value 606 is an example only and different implementations of the HAMR head 102 can use different magnitudes of the DFH control power 602.

The subsequent values 608 of the DFH control power 602 can alternate between a low value of the DFH control power 602 and a higher value of the DFH control power 602 in order to match the amount of power consumed through the laser 106 of FIG. 1B and the write element 110 of FIG. 1B. When the laser 106 and the write element 110 are disabled, the DFH control power 602 will shift to the higher value in order to minimize the variations in the flying height 108.

The uncorrected head-media spacing (HMS) curve 610 can show the large variations of the flying height 108 if it were not addressed by the DFH transaction unit 210. The uncorrected HMS curve 610 shows a constant increase in the oscillations, caused by the growing protrusions from the laser 106 and the write element 110, during the execution of the write command 142. By adjusting the amount of the DFH control power 602, calculated as being necessary by the DFH transaction unit 210, an actual flying height curve 612 can show a dampening of the variations, which compensates for the protrusions and the duty cycle of the laser 106 and the write element 110.

It has been discovered that the worst case skip mask application of the write command 142 can be managed by the DFH transaction unit 210 and the DFH controller 202 of FIG. 2. The graph of the DFH control adjustments 801 shows the actual flying height curve 612 converging, but all of the unmasked writes to the data track 116 can occur at the correct value of the flying height 108.

Figure 9:
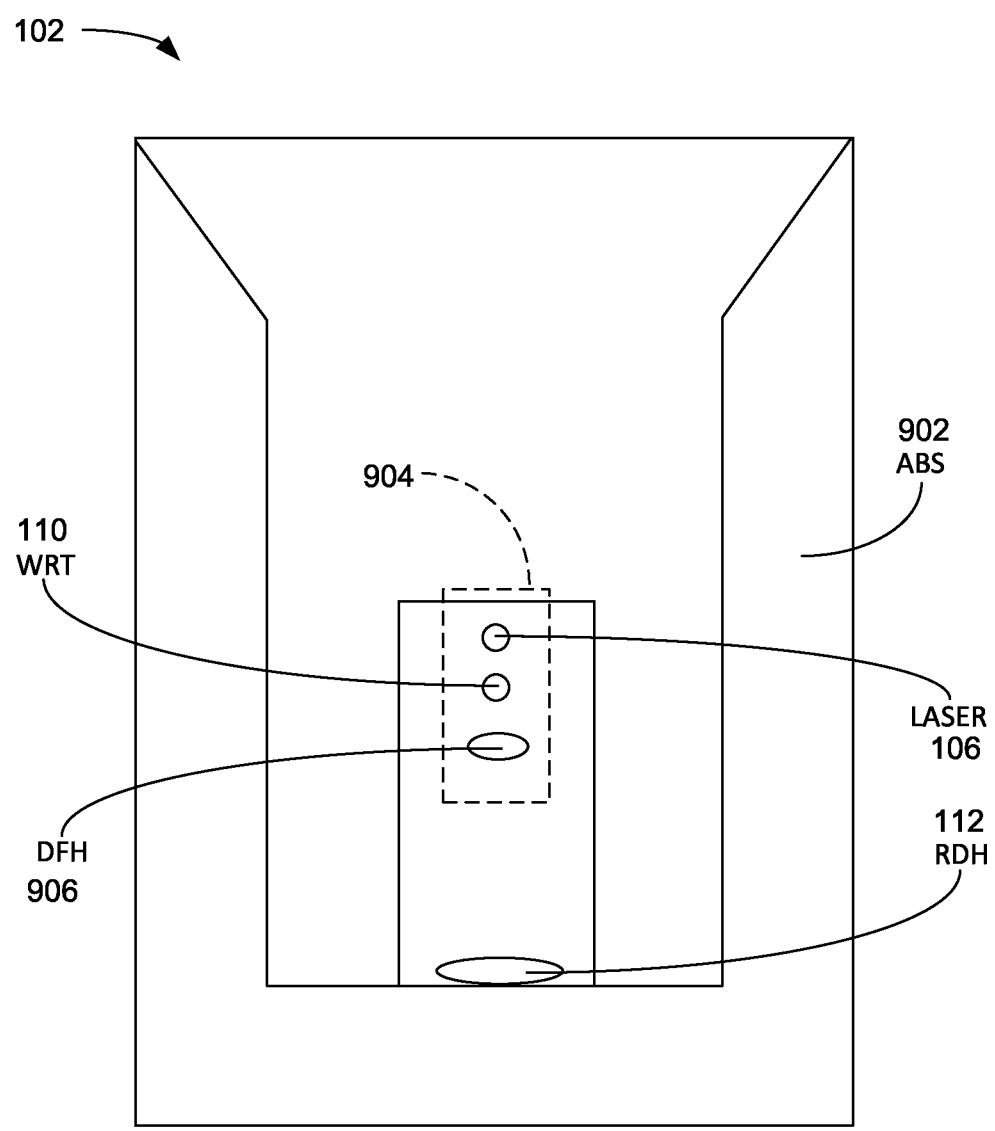
FIG. 9 is a bottom view of the heat assisted magnetic recording (HAMR) head in an embodiment.

Referring now to FIG. 9, therein is shown a bottom view of the heat assisted magnetic recording (HAMR) head 102 in an embodiment. The bottom view of the heat assisted magnetic recording (HAMR) head 102 depicts an air bearing surface (ABS) 902 that can provide the lifting surface for the HAMR head 102.

The laser 106 can be located approximately in the center of the HAMR head 102. The laser 106 can actually be located above the bottom surface of the ABS 902. The power of the laser 106 can be directed through a waveguide or lens structure to direct the power down on the media 104 of FIG. 1A. The write element 110 can be positioned near and behind the laser 106. During the execution of the write command 142 of FIG. 1A, a series of protrusions can form in a protrusion region 904. The protrusion region 904 can have areas adjacent to the laser 106, the write element 110, and a DFH control 906 that swell due to the heat developed by the elements. The protrusion region can extend below the bottom surface of the ABS 902. The protrusion region 904 can extend into the flying height 108 of FIG. 1B effectively reducing the head to media spacing.

The read element 112 can detect the data magnetically encoded on the media 104. During the processing of the servo sector 113 of FIG. 1A, a standard amplitude signal can be read and its amplitude checked against the expected amplitude in order to calculate the actual flying height. The result of the calculation of the flying height 108 can be conveyed to the DFH transaction unit 210 of FIG. 2 by the DFH controller 202 of FIG. 2. The DFH transaction unit 210 can calculate the subsequent values 608 of FIG. 6 of the DFH control power 602 of FIG. 6. The response time for the change in the actual flying height curve 612 of FIG. 6 can be in the range of 400 micro-seconds. This process can be applied similarly to the scenarios shown in FIG. 7 and FIG. 8. The DFH control 906 can be physically larger than the write element 110 and can develop a protrusion over a longer period of operation.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of various embodiments is that they valuably supports and services the historical trend of reducing costs, simplifying systems, and increasing performance.

These and other valuable aspects of the various embodiments consequently further the state of the technology to at least the next level.

While the various embodiments have been described in conjunction with a specific best mode, it is to be understood that many alternatives, modifications, and variations will be apparent to those skilled in the art in light of the aforegoing description. Accordingly, the embodiments are intended to embrace all such alternatives, modifications, and variations that fall within the scope of the included claims. All matters set forth herein or shown in the accompanying drawings are to be interpreted in an illustrative and non-limiting sense.

What is claimed is:

1. An apparatus comprising:
  a media;
  a heat assisted magnetic recording (HAMR) head over the media; and
  control circuitry, coupled to the HAMR head, the control circuitry being configured to:

receive a write command to write the media;
apply a dynamic flying height (DFH) control before asserting a write gate of the HAMR head;
assert the write gate to the HAMR head; and
enable a flying height compensation mechanism to maintain a constant value of a flying height of the HAMR head over the media during a next assertion of the write gate, the flight height compensation mechanism maintaining a history of write gate information to adjust the DFH control.

2. The apparatus as claimed in claim 1 wherein the flying height compensation mechanism comprises a control to control a timing of a new write operation with the HAMR head.

3. The apparatus as claimed in claim 1 wherein the control circuitry is further configured to schedule the DFH control at a specified time from an end of a servo gate.

4. The apparatus as claimed in claim 1 wherein the flying height compensation mechanism comprises, prior to the next assertion of the write gate, applying the DFH control based on a size of a protrusion on the HAMR head from the assertion of the write gate.

5. The apparatus as claimed in claim 1 wherein the flying height compensation mechanism comprises, prior to the next assertion of the write gate, applying the DFH control based on a duration of the assertion of the write gate.

6. The apparatus as claimed in claim 1 wherein the flying height compensation mechanism comprises maintaining a history register of a count of the assertions of the write gate to adjust the DFH control.

7. The apparatus as claimed in claim 1 wherein the control circuitry is further configured to store values of the DFH control, for the write command, in a command execution memory.

8. The apparatus as claimed in claim 1 wherein the control circuitry is further configured to detect a skip mask or a media error to adjust the DFH control.

9. The apparatus as claimed in claim 1 wherein the control circuitry is further configured to monitor a closed loop circuit to measure the flying height while writing.

10. The apparatus as claimed in claim 1 wherein the control circuitry is further configured to establish a complex trigger to transfer the DFH control to a preamplifier.

11. The apparatus as claimed in claim 1 wherein the control circuitry is further configured to reorder execution of the write command including the DFH control selected for the write command.

12. The apparatus as claimed in claim 1 wherein the flying height compensation mechanism comprises a controller coupled to a preamplifier, a head-media space (HMS) detector and a DFH control in the HAMR head managed by the controller.

13. The apparatus as claimed in claim 1 further comprising a DFH timer configured to monitor the update of a preamplifier serial port, to detect a set-up exception and a write fault error.

14. A method of operating an apparatus, the method comprising:
receiving a write command for writing a media;
applying a dynamic flying height (DFH) control to a heat assisted magnetic recording (HAMR) head;
asserting a write gate to the HAMR head; and
enabling a flying height compensation mechanism for maintaining a constant value of a flying height of the HAMR head over the media during a next assertion of the write gate, the flight height compensation mechanism maintaining a history of write gate information to adjust the DFH control.

15. The method as claimed in claim 14 wherein enabling the flying height compensation mechanism comprises enabling a control for controlling a timing of a new write operation with the HAMR head.

16. The method as claimed in claim 14 further comprising scheduling the DFH control at a specified time from an end of a servo gate.

17. The method as claimed in claim 14 wherein enabling the flying height compensation mechanism comprises applying the DFH control, based on a size of a protrusion on the HAMR head from the assertion of the write gate, prior to the next assertion of the write gate.

18. The method as claimed in claim 14 wherein enabling the flying height compensation mechanism comprises applying the DFH control, based on a duration of the assertion of the write gate, prior to the next assertion of the write gate.

19. The method as claimed in claim 14 wherein enabling the flying height compensation mechanism comprises maintaining a history register of a count of the assertions of the write gate to adjust the DFH control.

20. The method as claimed in claim 14 further comprising storing values of the DFH control, for the write command, in a command execution memory.

21. The method as claimed in claim 14 further comprising detecting a skip mask or a media error for adjusting the DFH control.

22. The method as claimed in claim 14 further comprising monitoring a closed loop circuit to measure the flying height while writing.

23. The method as claimed in claim 14 further comprising establishing a complex trigger for transferring the DFH control to a preamplifier.

24. The method as claimed in claim 14 further comprising reordering execution of the write command including selecting the DFH control for the write command.

25. The method as claimed in claim 14 wherein enabling the flying height compensation mechanism includes managing a DFH control for controlling a protrusion on the HAMR head and monitoring a head-media space (HMS) detector for actively measuring a flying height of the HAMR head.

26. The method as claimed in claim 14 further comprising detecting a write fault, during the next assertion of the write gate, by a DFH timer for detecting a set-up exception of a preamplifier serial port.

27. An apparatus comprising:
control circuitry, configured to be coupled to a heat assisted magnetic recording (HAMR) head that is over a media, the control circuitry being configured to:
receive a write command to write the media;
apply a dynamic flying height (DFH) control before asserting a write gate of the HAMR head;
assert the write gate to the HAMR head; and
enable a flying height compensation mechanism to maintain a constant value of a flying height of the HAMR head over the media during a next assertion of the write gate, the flight height compensation mechanism maintaining a history of write gate information to adjust the DFH control.

28. The apparatus as claimed in claim 27 wherein the flying height compensation mechanism comprises a control to control a timing of a new write operation with the HAMR head.

29. The apparatus as claimed in claim 27 wherein the control circuitry is further configured to schedule the DFH control at a specified time from an end of a servo gate.

30. The apparatus as claimed in claim 27 wherein the flying height compensation mechanism comprises, prior to the next assertion of the write gate, applying the DFH control based on a size of a protrusion on the HAMR head from the assertion of the write gate.

31. The apparatus as claimed in claim 27 wherein the flying height compensation mechanism comprises, prior to the next assertion of the write gate, applying the DFH control based on a duration of the assertion of the write gate.

32. The apparatus as claimed in claim 27 wherein the flying height compensation mechanism comprises maintaining a history register of a count of the assertions of the write gate to adjust the DFH control.

33. The apparatus as claimed in claim 27 wherein the control circuitry is further configured to store values of the DFH control, for the write command, in a command execution memory.

34. The apparatus as claimed in claim 27 wherein the control circuitry is further configured to detect a skip mask or a media error to adjust the DFH control.

35. The apparatus as claimed in claim 27 wherein the control circuitry is further configured to monitor a closed loop circuit to measure the flying height while writing.

36. The apparatus as claimed in claim 27 wherein the control circuitry is further configured to establish a complex trigger to transfer the DFH control to a preamplifier.

37. The apparatus as claimed in claim 27 wherein the control circuitry is further configured to reorder execution of the write command including the DFH control selected for the write command.

38. The apparatus as claimed in claim 27 wherein the flying height compensation mechanism comprises a controller coupled to a preamplifier, a head-media space (HMS) detector and a DFH control in the HAMR head managed by the controller.

39. The apparatus as claimed in claim 27 further comprising a DFH timer configured to
monitor the update of a preamplifier serial port, to detect a set-up exception and a write fault error.

40. The apparatus as claimed in claim 27 wherein the apparatus is a controller for a data storage device.

41. An apparatus comprising:
a media;
a heat assisted magnetic recording (HAMR) head over the media; and
control circuitry, coupled to the HAMR head, the control circuitry being configured to:
receive a write command to write the media;
apply a dynamic flying height (DFH) control before asserting a write gate of the HAMR head;
assert the write gate to the HAMR head;
enable a flying height compensation mechanism to maintain a constant value of a flying height of the HAMR head over the media during a next assertion of the write gate; and
a DFH timer configured to monitor the update of a preamplifier serial port, to detect a set-up exception and a write fault error.

* * * * *